United States Patent [19]
Olson et al.

[11] Patent Number: 5,633,970
[45] Date of Patent: May 27, 1997

[54] DEVICE WITH INTERNAL ASYMMETRICAL FEATURES FOR ROTATIONAL ALIGNMENT OF NON-SYMMETRICAL ARTICLES

[75] Inventors: Grieg A. Olson, Austin, Tex.; Daniel V. Attanasio, Clinton, Conn.; Nicholas A. Lee, Woodbury, Minn.

[73] Assignee: Minnesota Mining and Manufacturing Company, St. Paul, Minn.

[21] Appl. No.: 447,388

[22] Filed: May 23, 1995

[51] Int. Cl.⁶ ............................................ G02B 6/36
[52] U.S. Cl. ............................. 385/78; 385/84; 385/147
[58] Field of Search ................................... 385/53, 56, 58, 385/59, 60–68, 72, 78–84, 147

[56] References Cited

U.S. PATENT DOCUMENTS

| 4,792,205 | 12/1988 | Yin et al. . |
| 4,907,853 | 3/1990 | Hiratsuka . |
| 5,016,970 | 5/1991 | Nagase et al. . |
| 5,142,598 | 8/1992 | Tabone . |
| 5,146,525 | 9/1992 | Tabone . |
| 5,212,752 | 5/1993 | Stephenson et al. . |
| 5,212,753 | 5/1993 | Maranto . |
| 5,216,733 | 6/1993 | Nagase et al. . |
| 5,321,784 | 6/1994 | Cubukciyan et al. . |

FOREIGN PATENT DOCUMENTS

| 0 331 249 | 9/1989 | European Pat. Off. . | |
| 0478861 | 3/1992 | European Pat. Off. | 385/78 |
| 57-74714 | 3/1982 | Japan | 385/78 |
| 2 273 789 | 6/1994 | United Kingdom . | |

*Primary Examiner*—John Ngo
*Attorney, Agent, or Firm*—Gary L. Griswold; Walter N. Kirn; H. Sanders Gwin, Jr.

[57] ABSTRACT

A device for use in the rotational alignment of non symmetrical articles, such as non-cylindrically symmetrical optical elements which transmit and/or emit polarized light. In one embodiment, the current invention provides an optical fiber connector assembly which utilizes internal asymmetrical alignment features to optimize the rotational alignment of the polarization axes of an optical fiber element with respect to a rotational orientation-indicating reference on the connector.

31 Claims, 3 Drawing Sheets

DEVICE WITH INTERNAL ASYMMETRICAL FEATURES FOR ROTATIONAL ALIGNMENT OF NON-SYMMETRICAL ARTICLES

BACKGROUND OF THE INVENTION

1. Field of the Invention

The present invention relates to devices for use in the rotational alignment of non symmetrical articles, such as non-cylindrically symmetrical optical elements which transmit, emit or receive polarized light. More particularly, the present invention relates to a connector with an internal structure which may be used to optimize the rotational alignment of interconnected optical elements and maintain the polarization of light transmitted between them. Even more particularly, the present invention relates to a connector for non-cylindrically symmetrical optical fibers which includes multiple internal alignment features asymmetrically spaced about the connector axis. When the connector of the invention is utilized to connect a first non-cylindrically symmetrical optical fiber to a second non-cylindrically symmetrical fiber, the alignment features negate or minimize small alignment errors and allow the assembler to optimize the rotational alignment of the interconnected optical fibers with respect to a reference feature on the connector housing. The fibers may then be interconnected while maintaining accurate alignment of their polarization axes.

2. Description of Related Art

Optical elements, such as optical fibers, laser diodes and other light sources, polarizers, lenses, beam splitters and the like, are presently in wide use, particularly for high speed communication and data transmission. Connectors may be used to non-permanently connect, disconnect and reconnect the optical elements incorporated into an optical communication network, while splices may be used to permanently connect the network elements. The present application is directed to connectors, which may be easily coupled and uncoupled to allow multiple, non-permanent connection and reconnection of optical elements.

Many such connector designs are in present use. As explained in detail in U.S. Pat. No. 5,321,784, standardized connector designs used in telecommunications applications include the ST connector, the SC connector, and the FC connector. Regardless of the design selected for a particular application, alignment of the terminal ends of the connected optical elements is critical to maintain the signal strength as the light passes through the connection. To connect standard telecommunications grade optical elements, such as optical fibers (which essentially have cylindrical symmetry), the fibers must be supported and oriented both longitudinally and transversely to minimize attenuation of the light signal passing through the fiber connection. As is well known in the art, this is accomplished by optimizing fiber positioning to ensure minimum transverse and longitudinal offset between the fiber cores.

In contrast to the optical fibers utilized in the telecommunications industry, some optical fibers are non-cylindrically symmetrical. They may have non-circular cross sections, or may simply have performance that depends on their rotational orientation. Some non-cylindrically symmetrical fibers are constructed so that they are birefringent, that is, light of different polarizations will have different propagation characteristics within the fiber. For example, polarization maintaining (PM) and polarizing (PZ) fibers have a non-cylindrically symmetrical internal structure designed to maintain the polarization of the light in the fiber. Such fibers typically have two transverse axes associated with this polarization birefringence.

If plane polarized light is launched into the fiber so its plane of polarization coincides with a transverse axis of the fiber, the polarization of the light is maintained as the light propagates down the length of the fiber. When making a connection between two non-cylindrically symmetrical optical fibers, it is important to rotationally align the transverse axes of the two fibers accurately so that the polarization state will be preserved.

A measure of the performance in a polarization maintaining fiber optic system is polarization crosstalk, sometimes referred to as extinction ratio, which is defined as the ratio of the optical power of the light in the undesirable polarization state to the power of the light in the preferred polarization state. This ratio is related to the rotational orientation offset:

$$\frac{P_y}{P_x} = \tan^2(\beta),$$

where $\beta$ is the angle between the axes of the two fibers being connected, $P_x$ is the optical power in the preferred polarization state, and $P_y$ is the optical power in the orthogonal polarization state. The value of the crosstalk is commonly expressed in dB:

$$\text{Polarization Crosstalk (dB)} = 10\log\left(\frac{P_y}{P_x}\right)$$

It is desirable to have a polarization crosstalk of less than −30 dB. This level of performance requires alignment accuracy within about 2°. Unfortunately, there are also many other factors that adversely affect the polarization crosstalk. Therefore, in practice, it is desirable to have orientation accuracy of better than about 1°. Such high precision is very difficult to achieve with conventional connector designs.

Two principal existing optical fiber connector designs which have been used primarily for standard cylindrically symmetrical telecommunications fibers, FC and SC, are also generally suitable for use as connectors for non-cylindrically symmetrical fiber elements, such as PZ or PM optical fibers. Both these connector types normally include a projection or key on the connector which mates with a detail on the associated adapter, thus fixing the rotational alignment of the connector relative to the adapter and thus to a second connector. It is this control of rotational alignment of the connectors which makes SC and FC connectors suitable candidates for connectors of polarization-controlling optical fibers.

Some known SC and FC connector designs have limited rotational orientation capability. However, these designs are intended merely to reduce excess loss by the accommodation of eccentricity of fiber cores with respect to the connector bodies in the connection. For example, in U.S. Pat. No. 5,016,970 Nagase et al. discuss the problem of optical fiber misalignment and provide symmetrically opposed keyways in a ferrule body as a means of alignment. These keyways interlock with symmetrically opposed keys formed in a plug housing which receives the ferrule. The keys and corresponding keyways allow two possible orientations of the optical fiber in the plug housing. The alternate positions are symmetrically arranged and have a 180° separation. Stephenson et al. in U.S. Pat. No. 5,212,752 disclose a connector that has enhanced provisions for tuning eccentricities of an optical fiber core or fiber receiving passageway in a ferrule. Stephenson et al. minimize the influence of eccentricity by providing an SC-type fiber connector that may be united to a second fiber in a variety of fixed alignments. A series of trial connections, made using alternate fixed fiber alignments, eventually yields the lowest loss connection for a given connector. The limited orientation capability in the Nagase and Stephenson connector designs does not provide the accurate rotational orientation adjustment which is required when connecting non-cylindrically symmetrical optical fibers. In addition, conventional connector designs fail to include means to minimize or compensate for small alignment errors and manufacturing inaccuracies that would otherwise result in rotationally misaligned fibers.

Rotational alignment of polarization maintaining optical fibers is discussed in some detail by Nagase et al. in U.S. Pat. No. 5,216,733. The '733 patent discloses a method for aligning a fiber-bearing ferrule with a keyway formed in a ring-shaped flange and thereafter bonding the ferrule in position relative to this flange. Fiber alignment is made while observing the polarization orientation of light passing through the polished end of the optical fiber. Installation of the ferrule in the plug housing is limited to one of two rotationally equivalent positions determined when the internal key on the housing mates with the keyway of the ferrule flange.

The rotational symmetry of the PM optical fiber in the '733 patent matches the rotational symmetry of the associated connector housing. Therefore, the diametrically opposed keyways in the alignment flange, which are symmetrically spaced about the principal axis of the housing, provide rotationally equivalent positions for the retained fiber and contribute no added alignment benefit when the flange is engaged with the housing. The connector design described in the Nagase '733 patent thus fails to include means to minimize or compensate for small alignment errors and manufacturing inaccuracies.

SUMMARY OF THE INVENTION

The current invention is a rotational positioning subassembly which utilizes asymmetrical internal alignment features to optimize the rotational alignment of a retained article.

In one embodiment, to rotationally align an article with a transverse symmetry axis, the subassembly includes a holding member having an alignment feature. A retaining member is adapted to receive the holding member and includes at least two cooperative alignment features, each adapted to engage the alignment feature on the holding member. The alignment features on the retaining member are asymmetrically spaced about a longitudinal axis of the retaining member in a pattern adapted to the symmetry features of the article to be rotationally aligned. The alignment feature in the holding member may be engaged with any one of the alignment features on the retaining member to rotationally align the transverse symmetry axis of the article at an optimum angle with respect to a rotational reference feature on the retaining member.

In another embodiment, the present invention provides a subassembly to optimize the rotational alignment of an optical element. The subassembly of the invention may be utilized to optimally rotationally align the polarization axis of a second optical element with respect to that of a first optical element to permit accurate interconnection of the elements.

In yet another embodiment, the invention is a connector which utilizes internal asymmetrical alignment features to optimize the rotational alignment of the polarization axes of a non-cylindrically symmetrical optical fiber with respect to a rotational orientation-indicating feature on an external surface of the connector. The rotational orientation-indicating feature may then be aligned at any desired angle with respect to the polarization axes of another non-cylindrically symmetrical optical fiber.

The present invention also relates to a method for a connecting a second non-cylindrically symmetrical optical element with a second polarization axis to a first non-symmetrical optical element with a first polarization axis, comprising the steps of: (a) rotationally fixing the second optical element in a ferrule; (b) rotationally aligning and fixing the ferrule with respect to an alignment feature on a collar member; (c) providing a housing comprising an internal surface with a bore adapted to receive the collar member, the internal surface further comprising two cooperative alignment features, each adapted to engage the alignment feature on the collar member, wherein the alignment features in the housing bore are asymmetrically arranged with respect to an alignment reference on the exterior of the housing; (d) engaging successively the alignment feature on the collar member with each of the alignment features in the housing; (e) determining at each position the rotational alignment of the second polarization axis with respect to the reference feature on the housing; (f) re-engaging the alignment feature with the cooperative alignment feature which provides the optimal rotational alignment of the second polarization axis with respect to the reference feature; and (g) rotationally aligning the reference feature with respect to the first polarization axis.

In each of the connector designs described in the background above, a non-cylindrically symmetrical optical element, such as a polarization maintaining optical fiber, is rotationally fixed in a ferrule. The ferrule assembly is then intermated with a connector body and the polarization axis of the fiber is thereby oriented with respect to a particular alignment reference. When the polarization maintaining optical fiber is mounted in the ferrule assembly, assembler error or manufacturing inaccuracies will cause the fiber to be rotationally misaligned with respect to the alignment reference by some small angle $\theta$. This small rotational error will degrade the polarization performance of the connector when it is intermated with a terminal or another non-cylindrically symmetrical optical element.

To eliminate or at least partially negate this alignment error, the connector of the present invention provides a plurality of internal rotational alignment features which are asymmetrically arranged with respect to an alignment reference on the exterior of the connector. For example, in the case of an article with two-fold symmetry, each of two internal alignment features is offset by a small acute angle $\delta$ with respect to the alignment reference, so the features are then spaced apart by a rotational separation of $180°-2\delta$ with respect to the principal axis of the connector. Thus, when the rotationally fixed two-fold symmetric article, for example a PM or PZ optical fiber, is inserted into the connector housing and intermated with one of the two internal alignment features, the angle of the symmetry axis of the article with respect to the external alignment reference will be $\beta=\theta\pm\delta$, depending on which alignment feature is selected. With the present invention, the assembler may select the internal alignment feature which minimizes $\beta$, and reduces or eliminates the alignment error $\theta$. Thus, the present invention utilizes asymmetry in the connector to provide the assembler a "second chance" following the initial alignment procedure to minimize rotational alignment errors and optimize alignment accuracy.

For example, the invention may be used as an optical fiber connector to join a pair of two-fold symmetric articles like PM or PZ fibers. The angle of a fiber polarization axis is closely aligned with an alignment feature on a collar adapted to retain the fiber with some error, randomly distributed with a normal distribution about a mean angle $\alpha$, with standard deviation $\sigma$. The probability density function of the angle $\theta$ between the alignment feature on the collar and the polarization axis of the fiber is then $$P_\theta(\theta) = \frac{1}{\sqrt{2\pi\sigma^2}} e^{-(\theta-\alpha)^2/2\sigma^2} \quad \text{(Eq. 1)}$$

Angle $\beta$ is defined as the rotational error between the polarization axis of the fiber and the external alignment reference. The alignment Feature to be used in the connector is chosen so that the rotational error $\beta$ is minimized. If the alignment features of the connector are rotationally separated by angle $180°-2\delta$, then $\beta=\theta-\delta$ for $\theta>0$, and $\beta=\theta+\delta$ for $\theta<0$. Then the probability density function for $\beta$ becomes $$P_\beta(\beta) = \begin{cases} \frac{1}{\sqrt{2\pi\sigma^2}} e^{-(\beta+\delta-\alpha)^2/2\sigma^2} & (\delta<\beta) \\ \frac{1}{\sqrt{2\pi\sigma^2}} e^{-(\beta-\delta-\alpha)^2/2\sigma^2} & (-\delta>\beta) \\ \frac{1}{\sqrt{2\pi\sigma^2}} [e^{-(\beta+\delta-\alpha)^2/2\sigma^2} + e^{-(\beta-\delta-\alpha)^2/2\sigma^2}] & (-\delta<\beta<\delta) \end{cases} \quad \text{(Eq. 2)}$$

FIG. 5 shows calculated results for equations 1 and 2 for typical values normally encountered: $\alpha=0.5°$, $\sigma=1°$, and $\delta=0.75°$. It is clearly evident in the chart that the invention substantially improves the probability density in the region near zero rotational error. In other words, alignment accuracy is improved.

In one embodiment, the present invention provides a connector subassembly which includes a holding member with a passageway for a terminal end of a non-cylindrically symmetrical optical element having a polarization axis, such as a PM or PZ optical fiber. The holding member further includes an alignment feature adapted to engage either of at least two cooperative alignment features on an internal surface of a generally cylindrical housing with a longitudinal bore. The cooperative alignment features are arranged asymmetrically with respect to a rotational alignment reference on the external surface of the housing, and are most preferably spaced apart at an angle between about 175° and about 179.5° with respect to a longitudinal axis of the housing. In an alternate embodiment, an alignment feature is located on the internal surface of the housing bore, and the holding member includes at least two generally radially opposed cooperative alignment features adapted to engage the alignment feature on the housing. The cooperative alignment features on the holding member are most preferably spaced apart at an angle between about 175° and about 179.5° with respect to a longitudinal axis of the holding member.

After the PM or PZ optical fiber is rotationally fixed in the holding member, its polarization axis is identified, and the polarization axis is rotationally aligned with respect to an external alignment feature on an external surface of the housing, the alignment feature on the holding member may be freely inserted in either of the cooperative alignment features in the internal wall of the housing, allowing two possible rotational orientations of the holding member. The assembler may select a first alignment feature, insert the holding member in the bore of the housing, engage the alignment feature of the holding member with the first alignment feature in the internal housing wall, and determine the rotational alignment of the polarization axis of the fiber with respect to the external feature. The holding member may then be disengaged from the first alignment feature on the housing, rotated about the longitudinal axis of the housing, and its alignment feature may be engaged with the second alignment feature on the internal surface of the housing wall. The rotational alignment of the polarization axis of the fiber may again be compared with the exterior alignment feature. The rotational alignment in the second alignment feature is compared with the rotational alignment in the first alignment feature, and the alignment feature is selected which provides the best rotational alignment with respect to the external feature, and optimum optical performance for the connector.

In a preferred embodiment, the holding member comprises a ferrule with a longitudinal passageway for a terminal end of a PM or PZ optical fiber, and a collar member, which includes an axial longitudinal passageway contiguous with the passageway in the ferrule. The collar member includes a longitudinal key as an alignment feature, which is adapted to cooperatively engage either of two generally radially opposed asymmetric keyways on an internal surface of a generally cylindrical housing with a longitudinal bore. In an alternate embodiment, the internal surface of the housing includes a longitudinal key adapted to engage either of two generally radially opposed asymmetric keyways on the collar member.

The present invention may include means for biasing the collar member toward an appropriate end of the housing. If desired, the key on the collar member may be inserted or disengaged from the housing, or rotated about the longitudinal axis of the housing by a tool designed to engage the ferrule or the collar member.

If desired, the connector subassembly, with the polarization axis of the optical fiber optimized with respect to an external feature on the housing, may readily be intermated with an appropriate SC or FC-type latching member and joined to an optical fiber cable. The optical fiber cable with the attached connector may then be attached to an appropriate terminal for interconnection with another optical element or optical system.

In contrast to the related art which utilizes only symmetrically arranged connector engagement orientations, the present invention exploits asymmetries in the connector to optimize accuracy of rotational alignment. The present invention provides a means for partially compensating for manufacturing inaccuracies which would otherwise result in rotational misalignment of the polarization axes of the interconnected fibers.

Although a non-cylindrically symmetrical optical fiber is an example is an article with 2-fold rotational symmetry, it would be apparent to one of ordinary skill in the art that the asymmetrical internal alignment features of present invention could be arranged in an appropriate housing and utilized to rotationally position any article with any non-cylindrical rotational symmetry. The connectors in the embodiments described above are utilized to connect PM or PZ optical fibers to one another or to various optical elements. However, one of ordinary skill in the art would be aware that the connectors of the invention may also be used to retain and/or interconnect any optical device with non-cylindrically symmetrical internal geometry, whether birefringent or not, such as optical fibers with elliptical cores, multiple cores, and the like.

DETAILED DESCRIPTION OF THE INVENTION

Figure 1:
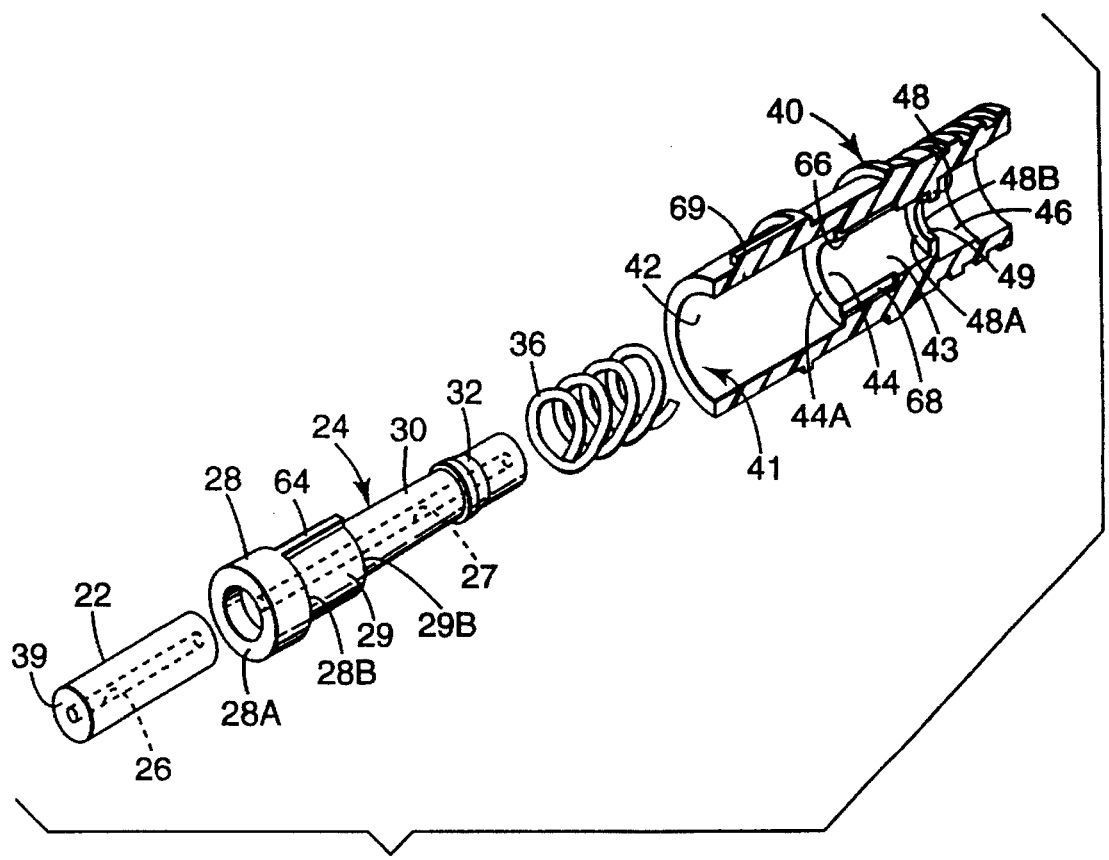
FIG. 1 is an exploded view, partially in section, of the components of the optical fiber connector subassembly of the invention.

Referring to FIG. 1, an embodiment of the present invention is illustrated in which the internal asymmetrical alignment features are incorporated into a subassembly for connection of non-cylindrically symmetrical optical fibers, such as PM or PZ fibers. The subassembly includes as a first principal component a holding member for the optical fiber, which preferably comprises a ferrule 22 and a collar member 24 adapted to rotationally retain the ferrule 22. The collar member 24 includes an alignment feature, such as, for example, a key 64, which engages either of at least two cooperative alignment features 66, 68 in a second principal component of the subassembly, a tubular housing 40. The housing may be an FC-type or an SC-type, and includes a stepped internal bore 41 adapted to engage the holding member.

The ferrule 22, preferably made of a ceramic material, includes a longitudinal passageway 26 adapted to retain a terminal end of the optical fiber (not shown). The ferrule 22 is rotationally retained by the collar member 24, which is made up of three axially aligned segments: a ferrule-engaging cup portion 28, a barrel portion 29 and a stem portion 30. The cup portion 28 includes a base 28B and an open end 28A. A first end (not shown) of the barrel 29 is attached to the base 28B of the cup portion, and the generally tubular stem portion 30 is attached to a base 29B of the barrel portion. The collar member includes a longitudinal axial passageway 27 which is contiguous with the passageway in the ferrule 22. The stem portion 30 of the collar member includes a retaining means, such as, for example, a tapered flange or ridge 32, on its exterior surface at the end distal the cup portion 28 of the collar member.

The cup portion 28 of the collar member 24 includes an alignment feature 64, in this embodiment a generally longitudinal key extending from the base of the cup portion along an exterior surface of the barrel portion 29. The arrangement of the key along the barrel portion 29 of the collar member allows the assembler to easily engage the key 64 with either of the cooperative alignment features, in this embodiment keyways 66 and 68, on the interior surface of the housing 40.

The FC-type tubular housing 40 illustrated in FIG. 1 has an internal wall with a stepped bore 41. A large diameter region 42 of the bore 41 at a proximal end of the housing 40 has a diameter sufficient to slideably engage the cup portion 28 of the collar member 24. A first shoulder 44 with an exposed face 44A creates an intermediate diameter region 43 of the bore 41 with a diameter sufficient to slideably engage the barrel portion 29 of the collar member 24. A small diameter region 49 of the bore has a diameter sufficient to slideably engage the stem portion 30 of the collar member 24. A second shoulder 48 with opposed faces 48A and 48B lies between the intermediate diameter region 43 of the bore and another region 46 of the bore, and includes a passageway 49 of sufficient diameter to provide an interference fit with the tapered flange 32 on the stem portion 30. An external surface of the housing 40 further includes at least one rotational reference feature 69, which serves to properly orient a completed connector assembly when mated to a terminal or device (not shown). The external reference feature 69 may be located anywhere on the external surface of the housing 40 which is physically accessible during the rotational alignment procedure. The actual structure of the reference feature may vary widely depending on the housing design, and may, for example, be a ridge, a flange, or a regular feature of the external surface of the housing.

A biasing means, such as, for example, a helical spring 36, may be inserted in the tubular housing 40 between the base 29B of the barrel portion of the collar member and the first face 48A of the shoulder 48 to maintain pressure behind the collar member and resist its longitudinal movement in the bore 41.

The internal wall of the housing 40 includes at least two asymmetrical cooperative alignment features in the intermediate diameter region 43 of the bore, in this embodiment the keyways 66 and 68. However, the internal wall of the housing may include multiple alignment features at selected asymmetrical angles of separation about the longitudinal axis of the housing 40. Each keyway 66, 68 is adapted to slideably engage the alignment feature, key 64, of the collar member 24. The key 64 and keyways 66, 68 must intermate precisely to prevent rotation of the collar 24 in the bore 41 of the housing 40 and thereby maintain rotational alignment and the highest level of fiber-to-fiber polarization preservation when the fibers are connected.

Figure 2A:
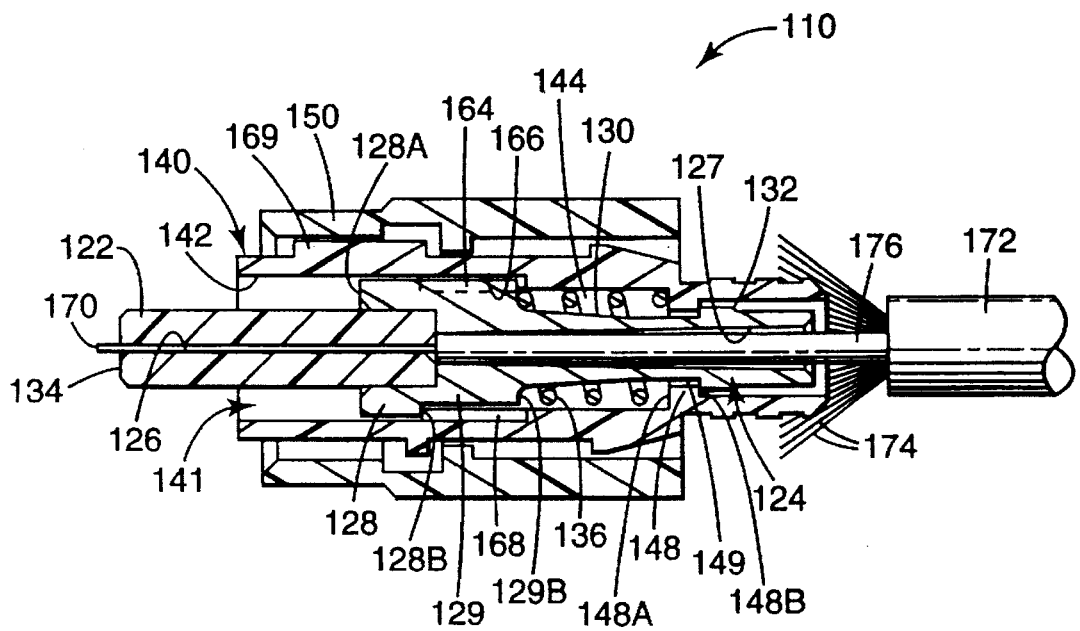
FIG. 2A is a longitudinal cross section of an FC-type optical fiber connector of the invention.

FIG. 2A is a cross-sectional view of an FC-type optical fiber connector 110 with an FC-type housing 140. The ferrule 122 is rotationally secured in the cup portion of the collar member 124 by any appropriate means, for example, with a suitable adhesive or by a press fit, and extends from the open end 128A of the cup portion. The alignment feature on the collar member, the longitudinal key 164, is intermated with the keyway 166 in the bore 141 of the housing 140. Once the collar member is positioned in the large diameter region 142 of the housing bore 141, and the key 164 on the collar member is engaged with the keyway 166, the collar member has some limited freedom to move longitudinally in the large diameter region 142 of the bore. The helical spring 136 acts in the intermediate diameter region 144 between the base 129B of the barrel member and the first face 148A of the second shoulder 148 to resist longitudinal movement of the collar member and preserve firm contact between the exposed ferrule end 134 and another ferrule or optical element (not shown). The diameter of the smaller region 149 of the housing bore permits the stem portion 130 of the collar member 124 to slide relative to the longitudinal axis of the housing 140. However, movement of the stem portion 130 toward the larger diameter region 142 of the housing bore is restricted after the tapered flange 132 snaps into place and engages the face 148B of the second shoulder 148.

A terminal end 170 of a non-cylindrically symmetrical optical fiber having a jacket 172 with reinforcing strands 174 and a buffer 176 may be inserted in the housing 140, and into the collar passageway 127, which may be tapered to facilitate insertion, if desired. The fiber then passes into the contiguous passageway 126 in the ferrule 122, and its advancing terminal end protrudes from the exposed end 134 of the ferrule 122. The optical fiber 170 may be secured in the ferrule passageway 126 with a suitable adhesive. The FC-type housing 140 in FIG. 2A may then be engaged with an appropriate FC-type latching member 150.

Figure 2B:
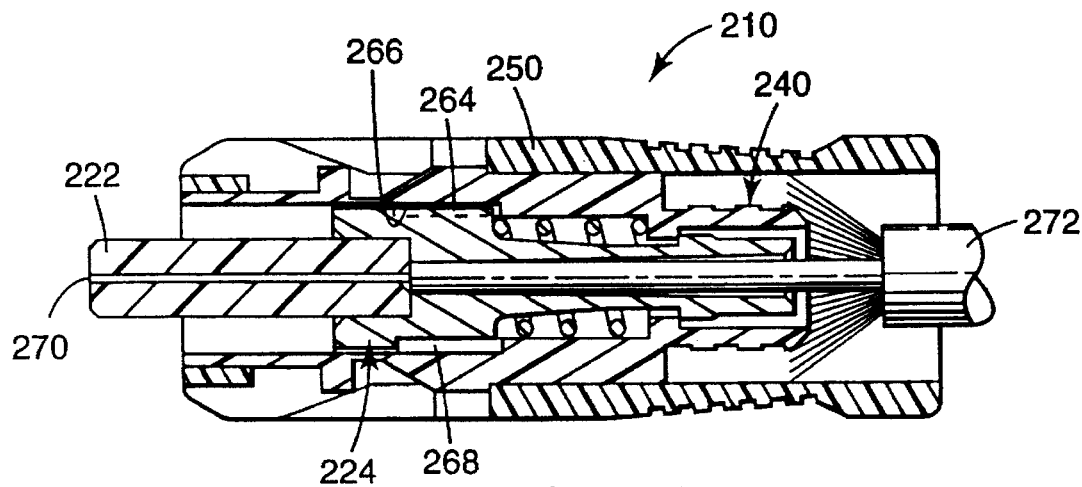
FIG. 2B is a longitudinal cross section of an SC-type optical fiber connector of the invention.

Referring to FIG. 2B, in another embodiment of the invention an SC-type connector 210 may be constructed with an SC-type housing 240 and an appropriate SC-type latching means 250.

Figure 3A:
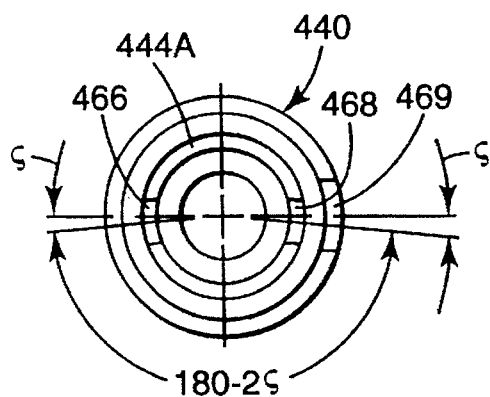
FIG. 3A is a front view of the tubular housing of the connector shown in FIG. 2A.
Figure 3B:
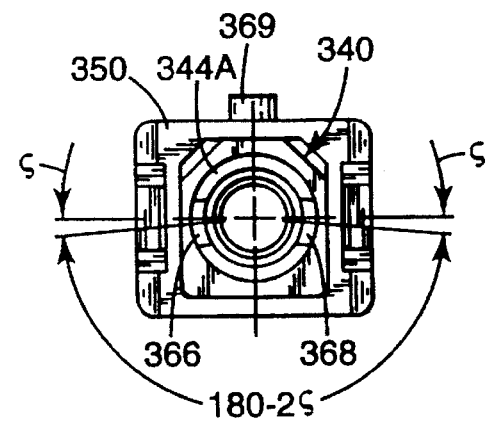
FIG. 3B is a front view of the tubular housing and latching means of the connector shown in FIG. 2B.
Figure 5:
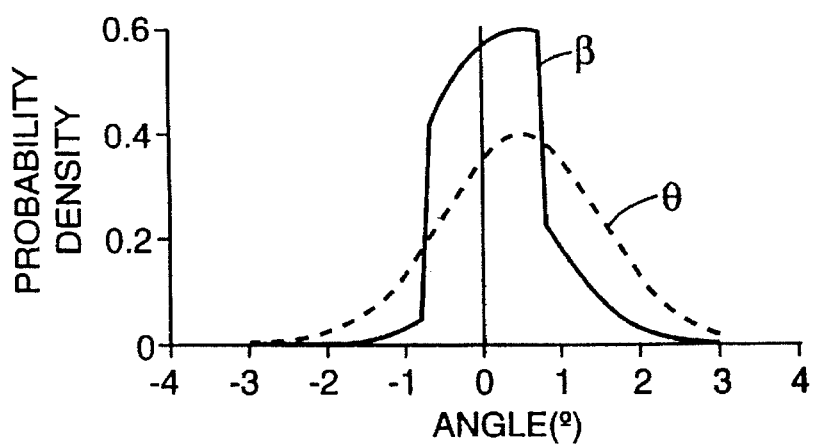
FIG. 5 is a plot showing calculated results of an alignment accuracy determination for an embodiment of the invention.

As shown in the end view of the SC-type connector in FIG. 3B, each of the keyways 366, 368 is offset by a small acute angle δ with respect to a rotational orientation reference feature 369 on an external surface of the housing 340. Therefore, the keyways are spaced about the longitudinal axis of the housing at a rotational separation of (180°−2δ). As explained above, accommodation of most operator error requires a range of offset θ with respect to the external reference feature 369 from about 0.5° to about 5°, so the opposed keyways 366 and 368 are preferably rotationally separated by about 175° to about 179.5° with respect to the longitudinal axis of the housing 340, i.e. preferably ranges from about 0.25° to about 2.5°. A similar FC-type connector is illustrated in FIG. 3A.

Figure 4:
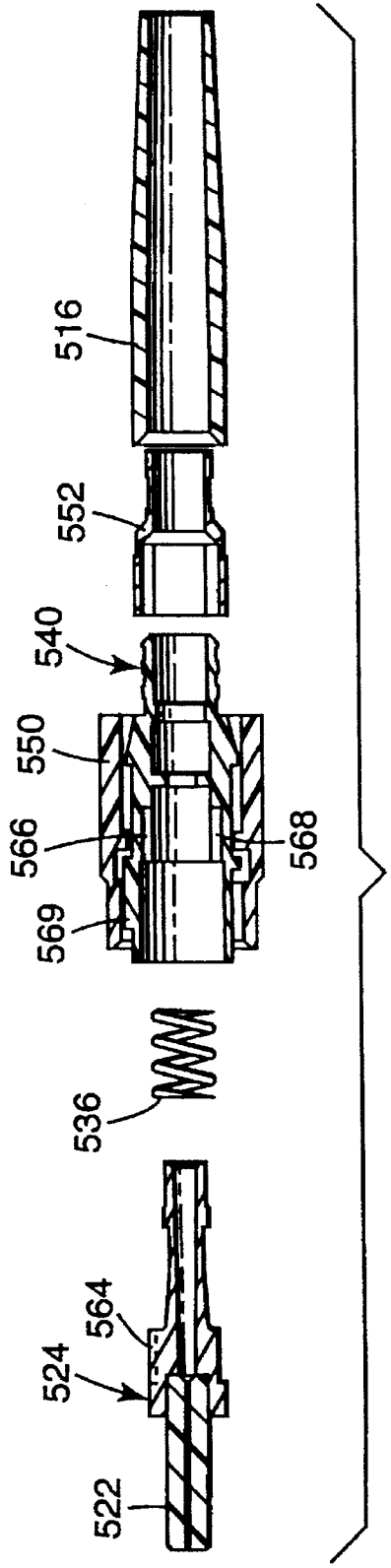
FIG. 4 is an exploded view of an FC-type connector assembly incorporating the subassembly of the invention.

Referring to FIG. 4, a crimp sleeve 552 may be used to secure an optical fiber cable (not shown) to the FC-type tubular housing 540 and latching member 550 illustrated in FIG. 2A. A boot member, such as a resilient sleeve 516, provides strain relief for the optical fiber cable in the region near the termination of the jacketed cable and protects the crimped joint. If an SC-type housing is selected, an appropriate SC-type latching member may be employed (see FIG. 2B). As is well known in the art, a screw thread formed on the internal wall of a knurled ring of the FC-type latching member mates with a corresponding thread on the component, i.e. cable, termination or device, receiving the optical cable.

The components of embodiments of a connector of the invention for non-symmetrical optical fibers have been described, and reference is again made to FIGS. 1 and 2 to consider the functional aspects of the connector that allow fine-tuning of polarization axis alignment according to the present invention. In operation, the jacket 172, reinforcing strands 174 and buffer 176 are mechanically or chemically removed from an optical fiber cable by means well known in the art. An uncoated portion of an optical fiber 170 which remains is inserted in the distal end of the stem portion 130 of the collar member 124 and enters the axial passageway 127 which passes from the stem portion 130 through the barrel portion 129 and into the cup portion 128. The fiber then passes into the contiguous passageway 126 in the ferrule 122, and its advancing terminal end protrudes from the exposed end 134 of the ferrule 122. The fiber is then rotationally fixed, preferably with an adhesive, in the ferrule passageway 126. The protruding fiber is then cleaved and its terminal end is polished according to procedures well known in the art.

Following the polishing procedure, the polarization axis of the fiber can be found using procedures that are well known in the art. The collar member 124 is then rotationally fixed, while the ferrule is allowed to rotate freely. The ferrule 122 is then rotated with respect to the collar 124 to optimally rotationally align the polarization axis of the fiber at a predetermined angle with respect to the key 164 on the collar 124. The predetermined rotational orientation of the fiber polarization axis with respect to the key 164 may be selected so that in the final assembly, the fiber polarization axis will have a desired angle with respect to the external key 169 on the housing 140, such as, for example, 0°, 45° or 90°. After this alignment procedure, the ferrule 122 is rotationally fixed, for example with an adhesive, in the cup portion 128 of the collar member 124.

Next, the cup portion 128 of the collar member is slideably engaged with the large diameter region 142 of the housing bore, and the key 164 on the collar member 124 is inserted into a randomly selected first of the two keyways 166 or 168 in the internal surface of the housing 140 until its longitudinal movement is arrested by the abutment of the flange 132 against the face 148A on the shoulder 148 in the bore. The assembler may then determine the rotational alignment of the polarization axis of the fiber with respect to the external reference feature 169. The collar member may then be disengaged from the first selected keyway, rotated about the longitudinal axis of the housing, and the key 164 may be engaged with the second keyway 166 or 168 on the internal surface of the housing wall. The rotational alignment of the polarization axis of the fiber may again be determined with respect to the exterior alignment reference feature 169. The rotational alignment in the second selected keyway is compared with the rotational alignment in the first selected keyway, and the keyway is selected which provides the optimum rotational alignment with respect to the external reference feature 169.

Following keyway selection, the collar member 124 may be inserted into the housing bore until the flange 132 snaps into place behind the second shoulder 148 and engages the face 148B of the second shoulder. The housing is next inserted into the appropriate latching member 150, which may be selected from FC-type and an SC-type. As illustrated in FIG. 4, the crimp ring 552 and the boot 516 may be then applied to complete the connector assembly. The connector assembly may then be attached to an appropriate terminal to connect the PM fiber with another PM fiber or optical device.

Figure 6:
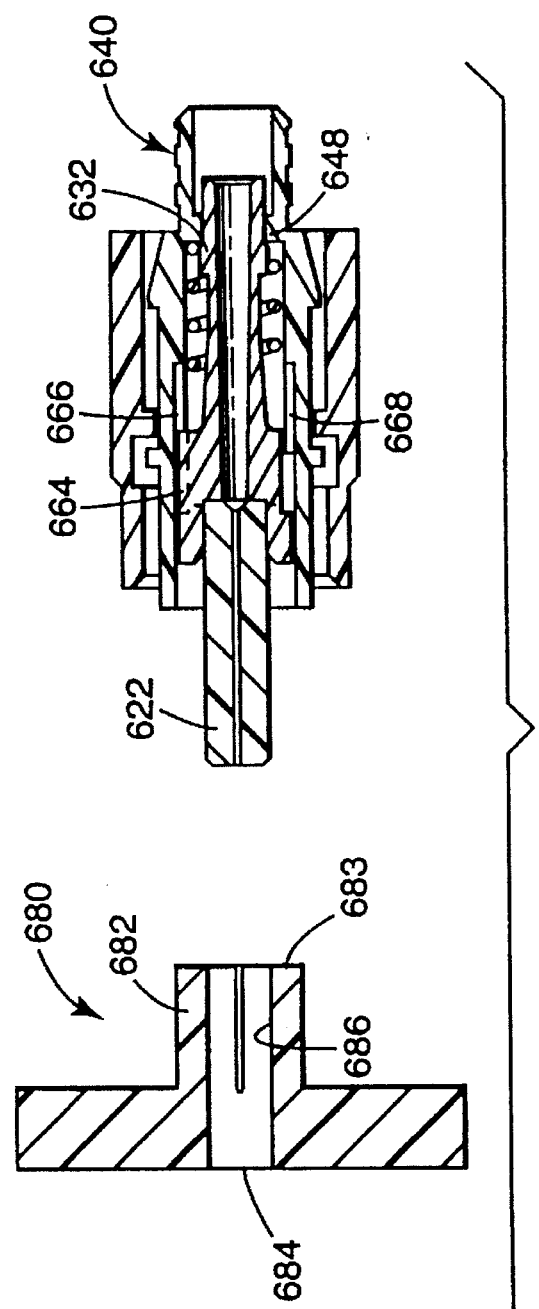
FIG. 6 is a cross-sectional view of a connector of the invention with an associated tool.

A tool may be used to rotate the collar assembly in the bore and insert the key 164 into one of the keyways 166 or 168. The design of the rotation tool will vary widely depending on the features and shape of the ferrule or the collar member, but one embodiment of such a tool is shown in FIG. 6. The tool 680 includes a generally cylindrical body 682 with a first end 683 and a second end 684. The first end 683 has an outer diameter adapted to slideably engage the larger diameter region of the bore of the housing and an axial passage 686 adapted to receive or grasp the ferrule. The passage 686 may be sized to provide an interference fit with the ferrule such that the friction between the ferrule and the orifice is sufficient to manipulate the collar assembly. Care must be taken to avoid excessive interference between the ferrule and the tool, in that this could cause inordinate stress within the ferrule, thus disturbing the polarization state of the fiber within the ferrule. Alternately, the tool could contain at least one interlocking feature (not shown) proximal passage 686. The shape and design of the feature may vary widely depending on the features of the collar member, and may be selected from pins, keys, blades, and the like adapted to engage the collar member. These interlocking features can provide the mechanical attachment needed for manipulating the collar assembly without applying undo stress to the ferrule.

While the embodiments of the devices exemplified above are directed to the interconnection of non-cylindrically symmetrical optical fibers, one of ordinary skill in the art would be aware that modifications of these devices to rotationally align or interconnect other articles would also be within the scope of the present invention.

What is claimed is:

1. A connector subassembly for non-cylindrically symmetrical optical elements, comprising:
   a holding member for an optical element having a polarization axis, wherein said holding member comprises a key; and
   a housing comprising an interior surface and an exterior surface, said interior surface being adapted to receive the holding member and comprising at least two cooperative keyways each adapted to engage the key on the holding member, wherein said keyways on the interior surface of the housing are asymmetrically spaced about a longitudinal axis of the housing; wherein the key in the holding member engages one of said keyways on the interior surface of said housing to optimize the rotational alignment of the polarization axis of the fiber at a predetermined angle with respect to a rotational reference feature on the exterior surface of said housing.

2. A connector subassembly as claimed in claim 1, wherein said holding member comprises a ferrule adapted to rotationally retain the optical fiber element and a collar member adapted to rotationally retain the ferrule.

3. A subassembly for a connector for non-cylindrically symmetrical optical fibers, comprising:
   a ferrule comprising a longitudinal passageway for a terminal end of a non-cylindrically symmetrical optical fiber with a polarization axis, wherein said fiber is rotationally fixed within said passageway;
   a collar member adapted to rotationally retain said ferrule, wherein said collar member has at least one alignment feature; and
   a housing comprising an internal surface with a longitudinal bore adapted to receive said collar member, said internal surface further comprising at least two cooperative alignment features, each adapted to engage the alignment feature on said collar member, wherein said alignment features on said housing are asymmetrically spaced about a longitudinal axis of the housing;
   and wherein the alignment feature in the collar member engages one of said alignment features on the housing to optimize the rotational alignment of the polarization axis of the fiber at a predetermined angle with respect to an external rotational reference feature on an exterior surface of said housing.

4. A connector subassembly as claimed in claim 3, wherein the alignment features on the housing have a rotational separation about the longitudinal axis of the housing of less than 180°.

5. A connector subassembly as claimed in claim 3, wherein the alignment features on the housing have a rotational separation about the longitudinal axis of the housing of about 175° to about 179.5°.

6. A connector subassembly as claimed in claim 3, wherein said collar member comprises one alignment feature, and wherein said housing comprises two alignment features adapted to receive the alignment feature on said collar member.

7. A connector subassembly as claimed in claim 6, wherein said alignment feature on the collar member is a longitudinal key and the alignment features on the housing comprise longitudinal keyways adapted to engage said key.

8. A connector subassembly as claimed in claim 3, wherein said rotational reference feature is a longitudinal projection on the external surface of said housing.

9. A connector subassembly as claimed in claim 3, wherein the bore is stepped, and comprises a large diameter region at a proximate end of said housing, a small diameter region at a distal end of said housing, and an intermediate diameter region between the large diameter region and the small diameter region, the interior surface of said housing further comprising a first shoulder between the large diameter region of the bore and the intermediate region thereof, and a second shoulder between the intermediate diameter region of the bore and the small region thereof.

10. A connector subassembly as claimed in claim 9, wherein said collar member comprises:
   a cup portion with a base and an open end,
   a barrel portion with a first end and a second end, wherein the first end of said barrel is attached to the base of the cup portion, and
   a generally tubular stem portion with a first end and a second end, wherein the first end of said stem portion is attached to the second end of said barrel portion;
   wherein said alignment feature comprises at least one elongate key extending from the base of the cup portion and longitudinally along an external surface of said barrel portion.

11. A connector subassembly as claimed in claim 10, wherein the cup portion, the barrel portion and the stem portion of said collar member are axially aligned, and wherein an axial passageway extends from the base of said cup portion through said barrel portion and said stem portion.

12. A connector subassembly as claimed in claim 11, wherein the cup portion of the collar member has an outside diameter sufficient to slideably engage the large diameter region of the bore, and the stem portion has a diameter sufficient to slideably engage the small diameter region of said bore.

13. A connector subassembly as claimed in claim 10, wherein the stem portion of said collar member further comprises an external retention feature proximal the second end thereof to engage the second shoulder of said housing.

14. A connector subassembly as claimed in claim 13, wherein said external retention feature on the stem portion of the collar member is a tapered circumferential flange.

15. A connector subassembly as claimed in claim 10, wherein the cup portion of the collar member is adapted to engage and rotationally fix the ferrule, and wherein the longitudinal passageway in the ferrule is contiguous with the passageway in the collar member.

16. A connector subassembly as claimed in claim 15, wherein said cup portion has an exposed top surface opposite the base thereof and proximal said open end, wherein said top surface is adapted to engage a tool for rotating the collar member with respect to the housing.

17. A connector subassembly as claimed in claim 9, further comprising means for biasing said collar member toward the proximate end of the housing.

18. A connector subassembly as claimed in claim 17, wherein the biasing means is a helical spring.

19. A connector subassembly as claimed in claim 3, wherein said predetermined angle is selected from the group consisting of 0, 45 and 90 degrees.

20. A connector as claimed in claim 3, wherein said collar member is adapted to engage a tool.

21. A subassembly for a connector for non-cylindrically symmetrical optical fibers, comprising:
   a ferrule comprising a longitudinal passageway for a terminal end of a non-cylindrically symmetrical optical fiber having a polarization axis, wherein said fiber is rotationally fixed within said passageway;

a collar member adapted to rotationally retain said ferrule, wherein said collar member comprises a longitudinal key and an axial passageway contiguous with the passageway in said ferrule; and a housing comprising an internal surface with a longitudinal bore adapted to receive said collar member, said internal surface further comprising two keyways, each adapted to engage the key on said collar member, wherein said keyways have a rotational separation about the longitudinal axis of the connector body of about 175° to about 179.5°; and wherein the key in the collar member engages one of said keyways in said housing to optimize the rotational alignment of the polarization axis of the fiber at a predetermined angle with respect to an external rotational reference feature on an exterior surface of said housing.

22. A connector for non-cylindrically symmetrical optical fibers, comprising:

a ferrule comprising a longitudinal passageway for a terminal end of a non-cylindrically symmetrical optical fiber with a polarization axis, wherein said fiber is rotationally fixed within said passageway;

a collar member adapted to rotationally retain said ferrule, wherein said collar member comprises a longitudinal key and an axial passageway contiguous with the passageway in said ferrule;

a housing comprising an internal surface with a longitudinal bore adapted to receive said collar member, said internal surface further comprising two keyways, each adapted to engage the key on said collar member, wherein said keyways have a rotational separation about the longitudinal axis of the connector body of about 175° to about 179.5°; wherein the key in the collar member engages one of said keyways in said housing to optimize the rotational alignment of the polarization axis of the fiber at a predetermined angle with respect to an external rotational reference feature on an exterior surface of said housing;

a crimp member for securing strengthening members of an optical fiber cable to said housing; and a latching member attached to and surrounding said housing, said latching member being selected from the group consisting of an SC-type and an FC-type.

23. The connector as claimed in claim 22, further comprising a boot member, attached to said housing, for relieving strain applied to the optical fiber cable proximate said crimp member.

24. A method for connecting a second non-cylindrically symmetrical optical element having a second polarization axis to a first optical element having a first polarization axis, comprising the steps of:

(a) rotationally aligning and fixing said second optical element with respect to an alignment feature in a holding member;

(b) providing a housing comprising an internal surface and an external surface, wherein the internal surface comprises a longitudinal bore adapted to receive said holding member, said internal surface further comprising first and second alignment features, each adapted to receive the alignment feature key on the holding member, wherein said keyways have a rotational separation about the longitudinal axis of the housing of about 175° to about 179.5°, and said external surface comprises a rotational alignment reference;

(c) engaging the alignment feature on the holding member in the first alignment feature in the housing, and measuring the rotational alignment of the second polarization axis with respect to the alignment reference;

(d) engaging the alignment feature on the holding member in the second alignment features in the housing, and measuring the rotational alignment of the second polarization axis with respect to the alignment reference;

(e) engaging the alignment feature on the holding member in the alignment feature on the housing which provides the optimum rotational alignment of the second polarization axis at a predetermined angle with respect to the alignment reference; and (f) rotationally aligning the alignment reference with respect to the first polarization axis.

25. A method as claimed in claim 24, wherein said optical element is an optical fiber.

26. A method as claimed in claim 25, further comprising the steps of applying a crimp member, securing strengthening members of an optical fiber cable to said housing, inserting said housing into a latching member selected from the group consisting of an SC-type and an FC-type, and attaching a boot member proximate said crimp member.

27. A method as claimed in claim 24, wherein said steps (c)–(e) are performed with a tool which engages the holding member.

28. A connection system for polarization maintaining (PM) optical fibers, comprising:

(a) at least one connector subassembly, comprising:

(i) a ferrule comprising a longitudinal passageway for a terminal end of a non-cylindrically symmetrical optical fiber with a polarization axis, wherein said fiber is rotationally fixed within said passageway;

(ii) a collar member adapted to rotationally retain said ferrule, wherein said collar member comprises a key and an axial passageway contiguous with the passageway in said ferrule; and (iii) a housing comprising an internal surface with a longitudinal bore adapted to receive said collar member, said internal surface further comprising two keyways, each adapted to engage the key on said collar member, wherein said keyways have a rotational separation about the longitudinal axis of the connector body of about 175° to about 179.5°; and wherein the key in the collar member engages one of said keyways in said housing to optimize the rotational alignment of the polarization axis of the fiber at a predetermined angle with respect to a rotational alignment reference on an exterior surface of said housing;

(b) means for biasing said collar member in the bore of the housing;

(c) a tool to engage at least one of the ferrule and the collar member and manipulate the ferrule or the collar member with respect to said housing;

(d) a crimp member for securing strengthening members of an optical fiber cable to the housing;

(e) at least one latching member for attachment to each subassembly, wherein said connector body is selected from the group consisting of an SC-type and an FC-type;

(f) a boot member for relieving strain applied to the optical fiber cable proximate said crimp member.

29. A connector subassembly for non-cylindrically symmetrical optical elements, comprising:

a housing with an interior surface and an exterior surface, wherein said interior surface comprises an alignment feature;

a holding member for an optical element with a polarization axis, wherein said holding member comprises at least two cooperative alignment features each adapted to engage the alignment feature on the housing, wherein said alignment features on said holding member are spaced at a rotational separation of about 175° to about 179.5° about a longitudinal axis of the holding member; and wherein the alignment feature in the housing engages one of said alignment features on said holding member to optimize the rotational alignment of the polarization axis of the element at a predetermined angle with respect to an external rotational alignment reference on the exterior surface of said housing.

30. A connector subassembly as claimed in claim 29, wherein said holding member comprises a ferrule adapted to rotationally retain the optical element and a collar member adapted to rotationally retain the ferrule, wherein said cooperative alignment features are located on said collar member.

31. A connector subassembly as claimed in claim 30, wherein the alignment feature on the housing is a key, and collar member comprises two keyways each adapted to engage the key on the housing.

* * * * *